No. 796,236. PATENTED AUG. 1, 1905.
H. E. MOFFAT.
FEED WATER PURIFIER.
APPLICATION FILED OCT. 10, 1902.

Witnesses.
Inventor:
H. E. Moffat.

UNITED STATES PATENT OFFICE.

HENRY ESSON MOFFAT, OF WOODSTOCK, CANADA.

FEED-WATER PURIFIER.

No. 796,236. Specification of Letters Patent. Patented Aug. 1, 1905.

Application filed October 10, 1902. Serial No. 126,719.

*To all whom it may concern:*

Be it known that I, HENRY ESSON MOFFAT, manufacturer, of the city of Woodstock, in the county of Oxford, in the Province of Ontario, Canada, have invented certain new and useful Improvements in Feed-Water Purifiers, of which the following is a specification.

My invention relates to improvements in feed-water purifiers; and the object of the invention is, first, to provide a means for removing the gases at the top of the purifying-tank, which prevents the precipitation of mineral matter upon the filtering material; secondly, to provide a simple means outside the tank for indicating the condition of the filtering material, so that when it becomes choked the fact will be communicated mechanically to the attendant engineer; thirdly, to provide a simple means for removing any surplus scum or foreign matter from the filterer; fourthly, to provide a simple means for preventing any impurities or foreign matter from passing the purifier into the supply-pipe for the boiler, and, fifthly, to provide a simple means for spreading the water over the filtering-bed; and it consists, essentially, first, of a pipe connected to the top of the purifying-tank above the filtering material and leading to the combustion-chamber of the furnace; secondly, of providing a supplemental head at the end of the grate-bars upon which the filtering material is supported and an overflow above the level of the filtering material and a water-wheel outside the head and between it and the head proper of the tank designed to be operated by the overflowing water and indicate through its spindle outside the tank when such overflow takes place; thirdly, of a pipe extending up into the tank from the bottom and provided with flaring collecting-wings located substantially on a level with the water; fourthly, of a hood extending above the level of the filtered water in the tank and beneath the grate on which the filtering material is supported and having holes at the bottom thereof, and, fifthly, of a trough extending lengthwise of the tank above the filtering-bed and having serrated edges, the parts being otherwise constructed and arranged in detail as hereinafter more particularly explained.

Figure 1:
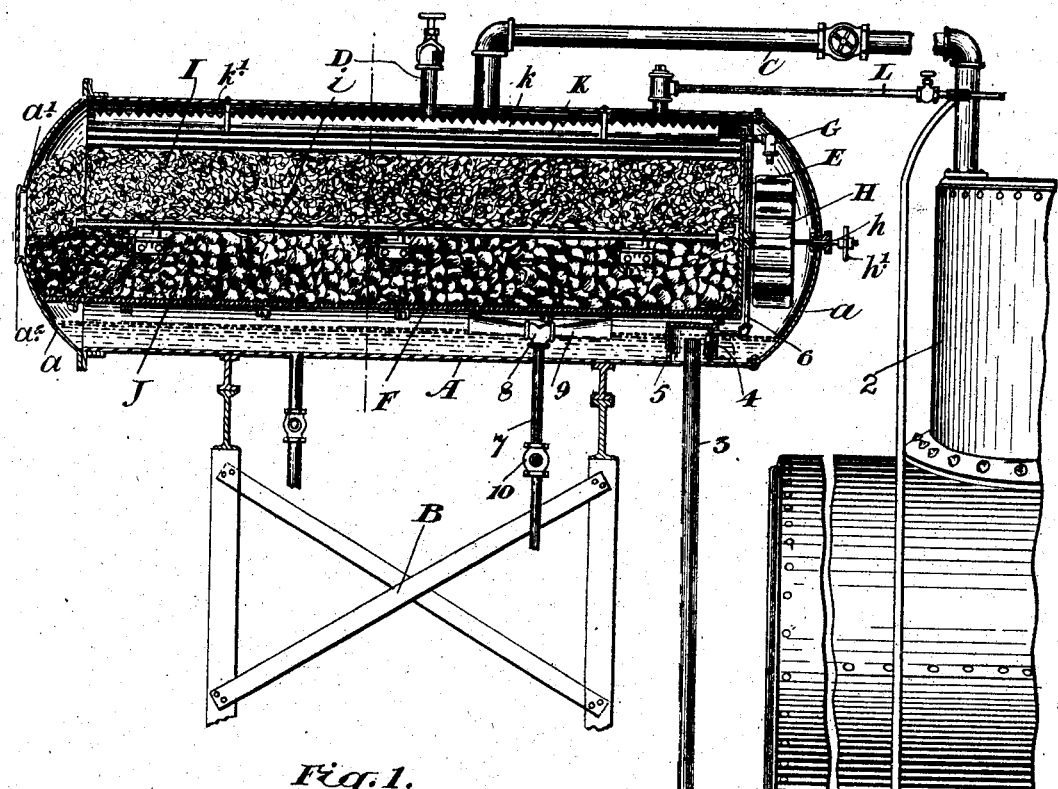
Figure 2:
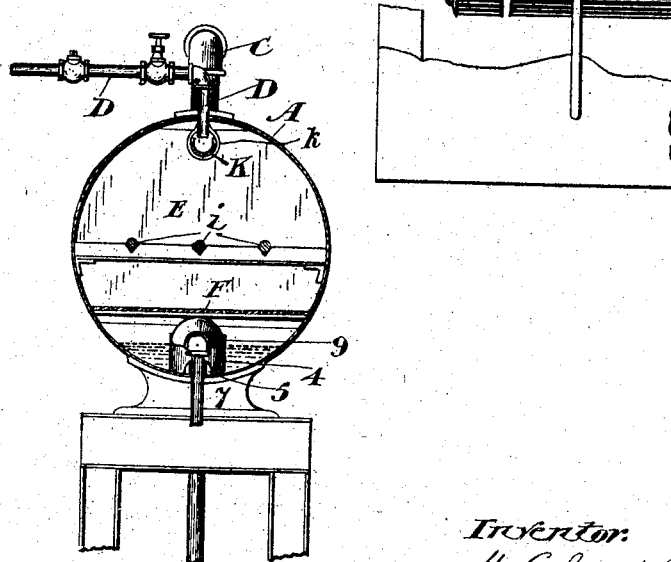

Figure 1 is an elevation for the most in section, showing the connections between my improved feed-water purifier and the boiler. Fig. 2 is a cross-section of the feed-water purifier.

In the drawings like letters of reference indicate corresponding parts in each figure.

A is a tank, which is preferably cylindrical in form, placed horizontally and provided with dome-shaped heads $a\,a$, one of which is provided with the usual orifice and cap $a'$ and $a^2$. The tank is supported on a suitable frame B so that it is above the level of the water in the boiler.

C is a steam-pipe leading from the top of the boiler 2 to the top of the purifier and designed to maintain a constant pressure in the purifier.

D is the water-supply pipe, which enters into the top of the tank, preferably centrally.

E is a wall which forms one end of the filtering-bed, and F is the grate, which extends from the bottom of the wall E to the opposite end of the tank.

G is an overflow pipe or elbow which extends through the wall A near the top above a miniature overshot water-wheel H, which is secured on a spindle $h$, journaled at one end in the wall E and at the opposite end in the end $a$ through a stuffing-box in which it extends. The outer end of the spindle is provided with suitable arms $h'$ or any suitable device, which may be suitably connected to a gong, so as to ring the same. The water-wheel is of course designed to be rotated by the overflow from the pipe G, caused by the filtering material being clogged with mineral matter, and thereby turning the spindle for the purpose above indicated.

I is the excelsior, which is supported on the longitudinal bars $i$, and J is the coke, which is supported on the grate F underneath the excelsior.

K is a spreading-pan having serrated edges $k$, such spreading-pan being supported on the hangers $k'$ above the filtering-bed, consisting of the excelsior and coke, as has hereinbefore been referred to.

The spreading-pan is designed, by means of the serrated edge, to spread the water evenly over the surface of the excelsior. The filtered water passes through the filtering-bed to the bottom of the tank, as indicated.

L is a pipe which is connected to the top of the purifying-tank, as indicated, and extends to the furnace or combustion-chamber. The pipe L is designed to carry off the gases which accumulate in the water within the tank and which retards precipitation of the mineral matter on the filtering-bed. Such gases as are combustible in character are burned in the furnace, where they serve to increase combustion and prevent smoke.

During the use of the feed-water heater carbonic oxid and carbonic-acid gas are generated by the action of the steam upon the unpurified water, which causes a precipitation of the solid matter contained therein when the temperature of the feed-water is raised approximately to boiling-point. The precipitates are retained by the filter, and the gases rise to the top of the purifying-tank. Certain of these gases, such as the carbonic oxid and the hydrogen generated in the filtering-tank, can be used to assist the combustion within the furnace.

3 is a supply-pipe which extends through the bottom of the purifying-tank into the bottom of the boiler.

4 is a hood which extends over the supply-pipe 3 and is provided with orifices 5. The hood preferably extends above the level of the filtered water in the bottom of the purifier, which is preferably kept at a constant level.

6 is a pipe which leads from outside the wall E, near the top thereof, into the hood 4. The pipe 6 is designed to remove any steam which may accumulate in the hood above the supply-pipe 3.

The hood 4 serves to remove further impurities, which may pass through the filtering-beds and be arrested at the top of the water from escaping into the supply-pipe 3.

7 is a pipe leading through the bottom of the purifying-tank and having a substantially T-shaped top joint 8, to which are connected the flaring wings 9, which are open at the end and the bottom edges of which extend beneath the level of the surface of the filtered water at the bottom of the tank.

The pipe 7 is provided with a suitable faucet 10, which may be opened as may be desired, and thereby provide for the removal of any scum, vegetable or foreign matter, which passes through the filtering-bed in its passage to the supply-pipe 3.

What I claim as my invention is—

1. In a feed-water purifier, the combination with the purifying-tank and steam-pipe therefor connected to the boiler and the water-supply pipe extending from the bottom of the purifying-tank into the bottom of the boiler, of a filtering-bed and grate, and the supplemental wall at the end of the grate, an overflow at the top of the filtering-bed and means operated by such overflow for indicating on the outside of the purifying-tank the condition of the filtering-bed as and for the purpose specified.

2. In a feed-water purifier, the combination with the purifying-tank and steam-pipe therefor connected to the boiler and the water-supply pipe extending from the bottom of the purifying-tank into the bottom of the boiler, of a filtering-bed and grate, and the supplemental wall at the end of the grate, an overflow at the top of the filtering-bed and a water-wheel located underneath the overflow-pipe and secured on a suitable spindle journaled in the supplemental wall and having the stem thereof extending through the end of the purifying-tank as and for the purpose specified.

3. In a feed-water purifier, the combination with the purifying-tank and steam-pipe therefor connected to the boiler and the water-supply pipe extending from the bottom of the purifying-tank into the bottom of the boiler, of a hood extending over the top of the water-supply pipe and provided with suitable orifices and a steam relief-pipe extending from the hood upwardly into the purifying-tank as and for the purpose specified.

4. In a feed-water purifier the combination of the purifying-tank, a steam-pipe therefor, an inlet-pipe for the purifying-tank, a water-supply pipe extending from the purifying-tank to the water-space of the boiler, and a gas-conduit extending from the top of the purifying-tank to the furnace whereby the carbonic oxid and other gases generated in the purifying-tank are conveyed to the combustion-chamber.

HENRY ESSON MOFFAT.

Witnesses:
J. G. WALLACE,
ELLA L. CLARKE.